United States Patent
Mor et al.

(10) Patent No.: US 7,233,280 B2
(45) Date of Patent: Jun. 19, 2007

(54) SELECTING AN OPTIMAL SATELLITE POSITIONING SYSTEM RECEIVER

(75) Inventors: Tal Mor, Coral Springs, FL (US); Sergio Bustamante, Pembroke Pines, FL (US); Brian E. Bucknor, Miramar, FL (US); Russell S. Nelson, Coconut Creek, FL (US)

(73) Assignee: Motorola, Inc., Schaumburg, IL (US)

( * ) Notice: Subject to any disclaimer, the term of this patent is extended or adjusted under 35 U.S.C. 154(b) by 292 days.

(21) Appl. No.: 11/130,449

(22) Filed: May 16, 2005

(65) Prior Publication Data

US 2006/0256003 A1 Nov. 16, 2006

(51) Int. Cl.
*G01S 1/00* (2006.01)
*H04B 7/185* (2006.01)

(52) U.S. Cl. .................................. 342/357.02

(58) Field of Classification Search ........... 342/357.01, 342/465, 357.02; 701/215
See application file for complete search history.

(56) References Cited

U.S. PATENT DOCUMENTS

| 6,801,855 B1* | 10/2004 | Walters et al. .............. 701/216 |
| 2006/0205368 A1* | 9/2006 | Bustamante et al. ........ 455/101 |
| 2006/0229811 A1* | 10/2006 | Herman et al. ............. 701/213 |

\* cited by examiner

*Primary Examiner*—Thomas H. Tarcza
*Assistant Examiner*—Nga X. Nguyen

(57) ABSTRACT

A device (100) has a port (108), a first SPS receiver (104), and a processor (106) coupled to the first SPS receiver and the port. The processor is programmed to detect (102) a second SPS receiver (107) at the port, deactivate (206) the first SPS receiver, and determine (208) a location of the device according to signals received by the second SPS receiver from GPS satellites.

20 Claims, 2 Drawing Sheets

100

SELECTING AN OPTIMAL SATELLITE POSITIONING SYSTEM RECEIVER

FIELD OF THE INVENTION

This invention relates generally to SPS (Satellite Positioning System) receivers, and more particularly to selecting an optimal SPS receiver.

BACKGROUND OF THE INVENTION

When a SPS receiver is placed at a location where there are obstructions (inside an automobile, for example), there are instances where it may not be possible for the SPS receiver to detect sufficient GPS (Global Positioning System) satellites roaming the Earth to estimate a location of the SPS receiver.

SUMMARY OF THE INVENTION

Embodiments in accordance with the invention provide an apparatus and method for selecting an optimal SPS receiver.

In a first embodiment of the present invention, a device has a port, a first SPS receiver, and a processor coupled to the first SPS receiver and the port. The processor is programmed to detect a second SPS receiver at the port, deactivate the first SPS receiver, and determine a location of the device according to signals from GPS satellites received by the second SPS receiver.

In a second embodiment of the present invention, a device has a first SPS (Global Positioning System) receiver. The device operates according to a method comprising the steps of detecting a second SPS receiver, deactivating the first SPS receiver, and determining a location of the device according to signals from GPS satellites received by the second SPS receiver.

In a third embodiment of the present invention, a selective call radio (SCR) has a wireless transceiver, a port, a first SPS receiver, and a processor coupled to the wireless transceiver, the first SPS receiver, and the port. The processor is programmed to detect a second SPS receiver at the port, deactivate the first SPS receiver, and determine a location of the device according to signals from GPS satellites received by the second SPS receiver.

DETAILED DESCRIPTION

Figure 1:
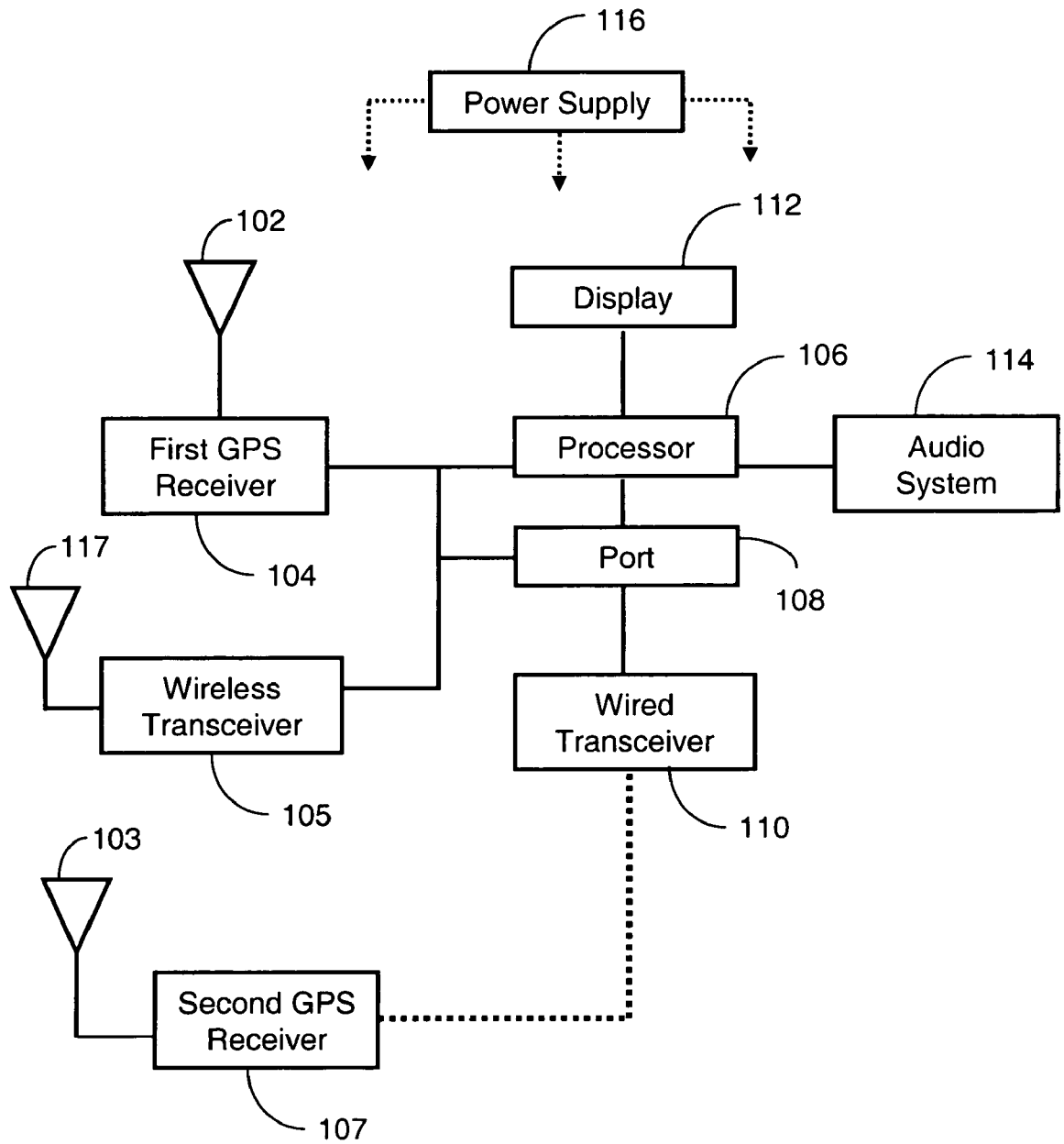
FIG. 1 is a block diagram of a device in accordance with an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is a block diagram of a device 100 in accordance with an embodiment of the present invention. In its simplest embodiment, the device 100 has conventional technology comprising an antenna 102, a first SPS receiver 104 coupled thereto, a port 108, a conventional power supply 116 (utilizing one or more batteries or conventional electricity from a utility) for supplying power to the components 102-114 of the device 100, and a processor 106 coupled to the foregoing components. The first SPS receiver 104 utilizes conventional technology for processing signals from GPS satellites to determine under the control of the processor 106 a location of the device 100. The port 108 utilizes conventional technology for coupling to accessories supported by the device 100. For example, the port 108 can be used to couple a second conventional SPS receiver 107 having its own antenna 103 to the processor 106. Coupling to the second SPS receiver 107 can be direct or indirect by way of other communication devices as will described below.

In a supplemental embodiment, the device 100 further comprises a conventional wired transceiver 110 coupled to the port 108, or a conventional wireless transceiver 105 coupled to the processor 106. The wired transceiver 110 can be used for communicating with the second SPS receiver 107 by way of a physical connection including, but not limited to, an optical link (IrDA—Infrared Data Association), or one or more wires (e.g., coax cable) carrying electrical signals to and from the second SPS receiver 107. The wireless transceiver 105, on the other hand, can be used to communicate with the second SPS receiver 107 utilizing infrared signals and/or short range wireless antenna 117. These wireless signals can conform to any number of conventional over-the-air protocols such as Bluetooth™, IEEE 802.11a, IEEE 802.11b, IEEE 802.11 g, or combinations thereof.

Data exchanged between the second SPS receiver 104 and the port 108 wirelessly or by way of a physical connection preferably complies with a protocol developed by the National Marine Electronics Association (NMEA). It will be appreciated by one of ordinary skill in the art, however, that other messaging and over-the-air protocols can be used within the scope and spirit of the claims described below.

In yet another supplemental embodiment, the device 100 can be embodied in a portable selective call radio (SCR), herein referred to as SCR 100, for communicating with a conventional communication network such as a cellular communication system. In this embodiment, the power supply 116 utilizes conventional technology to extract energy supplied by one or more batteries. Additionally, a separate wireless transceiver (not shown in FIG. 1) can be employed that utilizes conventional technology for communicating with a cellular network. This second wireless transceiver can utilize any one of a number of conventional over-the-are protocols such as CDMA (Code Division Multiple Access), TDMA (Time Division Multiple Access), or GSM (Global System for Mobile communications). In this embodiment, the SCR 100 can be used for exchanging voice and/or data signals with the cellular communication network.

In yet another supplemental embodiment, the SCR 100 further comprises conventional technology including a display 112 and an audio system 114. The display 112 can be used by the processor 112 to present to an end user of the SCR 100 a UI (User Interface) for manipulating functions of the SCR 100. The audio system 114 can be used by the processor 112 to present audible signals to the end user such as music, alerts, synthetic voice during a navigation application utilizing a SPS receiver, or other relevant sounds pertaining to a function of the SCR 100.

Figure 2:
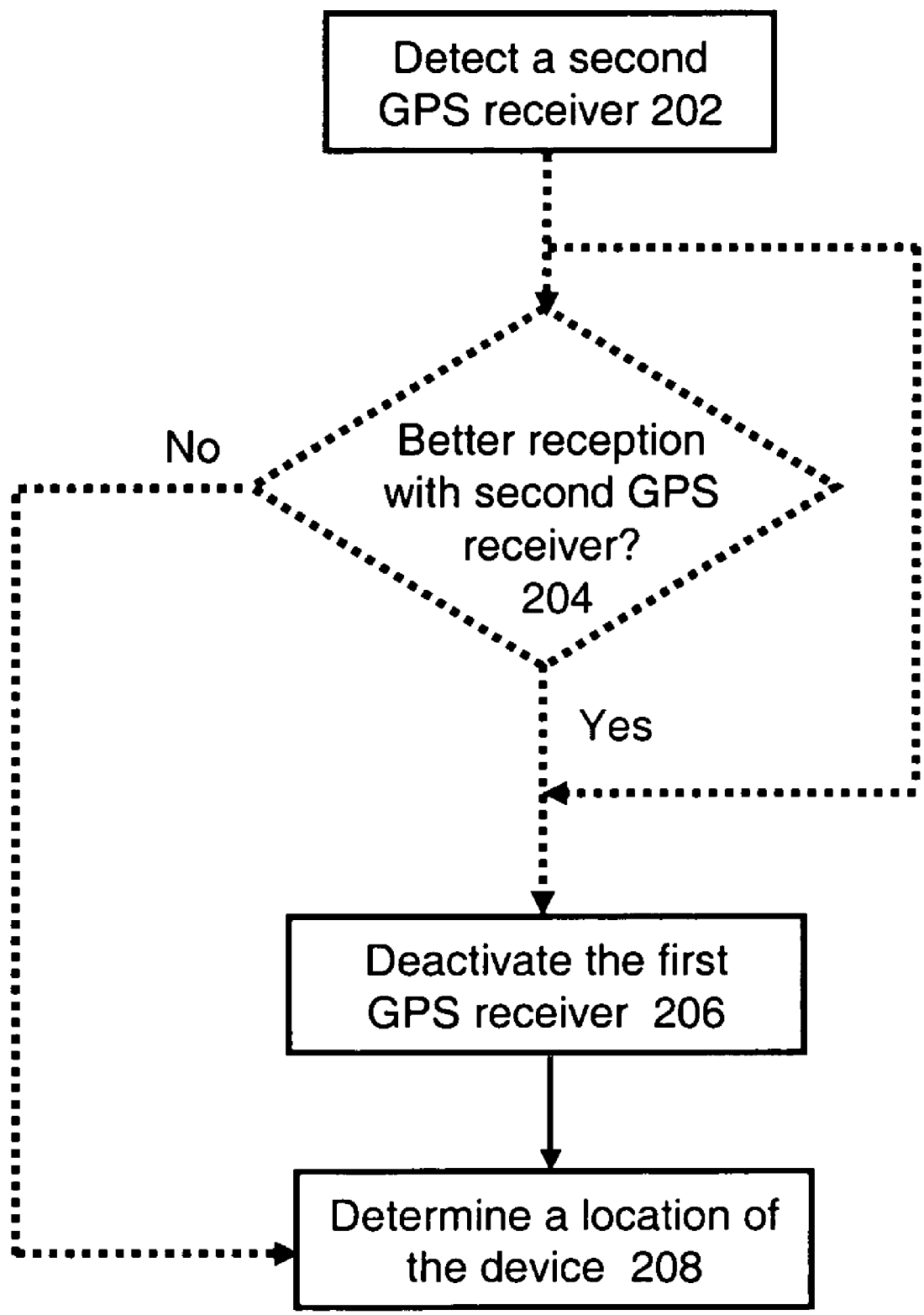
FIG. 2 is a flow chart depicting a method operating in the device in accordance with an embodiment of the present invention.

FIG. 2 is a flow chart depicting a method 200 operating in the device in accordance with an embodiment of the present invention. The method 200 begins with step 202 where the processor 106 is programmed to detect the presence of the second SPS receiver 107 at the port 108. The detection step can take place when, for example, an end user of the SCR 100 enters an automobile having a built-in second SPS receiver 107 that is integral with the automobile's navigation system, and a coupling with the SCR 100 takes place in one of several ways. A first coupling method can be by way of a physical connection such as, for example, inserting the SCR 100 into a cradle of the automobile, which is wired directly to the second SPS receiver 104. Alternatively, the SCR 100 can be coupled to the second SPS receiver 107 wirelessly utilizing any of the aforementioned wireless technologies. The detection step can be accomplished by way of a conventional interrupt system of the processor 106 for immediate detection, or by way of polling method applied to the port 108 for detecting the presence of accessories.

In the present embodiment, the processor 106 proceeds to step 206 where it deactivates the first SPS receiver 206 and proceeds to determine a location of the SCR 100 in step 208 utilizing the second SPS receiver 107 which processes signals from GPS satellites it detects. By disabling the first SPS receiver 206, the SCR 100 consumes less energy from the power supply 116 and thereby extends the battery life of the SCR 100. Additionally, the SCR 100 can supply power to the second SPS receiver 107 if needed.

In a supplemental embodiment, the processor 106 can be programmed to proceed to step 204 where it determines that the second SPS receiver 107 provides better reception of signals from GPS satellites than the first SPS receiver 104. This can be accomplished by conventional means such as, for example, receiving an indication from each SPS receiver 104 and 107, respectively, as to the number of GPS satellites detected and the power level of signals detected from said GPS satellites.

To determine better reception, the processor 106 can select, for example, the SPS receiver 104 having the most GPS satellites detected with the strongest signals from said satellites. Accordingly, if in step 204 the second SPS receiver 107 does not provide better reception than the first SPS receiver 104, then the processor 106 skips step 206 and proceeds to step 208 where it locates the SCR 100 utilizing the first SPS receiver 104. If, on the other hand, the second SPS receiver 107 provides better reception, then the processor 106 proceeds with the deactivation and determining steps 206-208 as described earlier.

In light of the foregoing description, it should be recognized that embodiments in the present invention could be realized in hardware, software, or a combination of hardware and software. These embodiments could also be realized in numerous configurations contemplated to be within the scope and spirit of the claims below. It should also be understood that the claims are intended to cover the structures described herein as performing the recited function and not only structural equivalents.

What is claimed is:

1. A device, comprising:
    a port;
    a first SPS (Satellite Positioning System) receiver; and
    a processor coupled to the first SPS receiver and the port, wherein the processor is programmed to:
        detect a second SPS receiver at the port;
        deactivate the first SPS receiver; and
        determine a location of the device according to signals from GPS (Global Positioning System) satellites received by the second SPS receiver.

2. The device of claim 1, wherein the processor is further programmed to proceed to the deactivate and determine steps after determining that the second SPS receiver provides better reception of signals from GPS satellites than the first SPS receiver.

3. The device of claim 1, wherein the port is coupled to a wireless transceiver for communicating with the second SPS receiver.

4. The device of claim 3, wherein signals from the wireless transceiver are infrared.

5. The device of claim 3, wherein signals from the wireless transceiver are radio waves.

6. The device of claim 3, wherein wireless communications with the second SPS receiver complies with a standard known as Bluetooth™.

7. The device of claim 3, wherein wireless communications with the second SPS receiver complies with one among a group of standards comprising IEEE 802.11a, IEEE 802.11b and IEEE 802.11 g.

8. The device of claim 3, wherein data exchanged between the second SPS receiver and the port wirelessly complies with a protocol developed by the National Marine Electronics Association (NMEA).

9. The device of claim 1, further comprising a transceiver coupled to the port for communicating to the second SPS receiver by way of a physical connection.

10. The device of claim 9, wherein the physical connection is an optical link.

11. The device of claim 9, wherein the physical connection is one or more wires.

12. The device of claim 9, wherein data exchanged between the second SPS receiver and the port by way of the physical connection complies with a protocol developed by the National Marine Electronics Association (NMEA).

13. The device of claim 1, further comprising a wireless transceiver for communicating with other devices by way of a communication network coupled thereto.

14. In a device having a first SPS (Global Positioning System) receiver, a method comprising the steps of:
    detecting a second SPS receiver;
    deactivating the first SPS receiver; and
    determining a location of the device according to signals from GPS satellites received by the second SPS receiver.

15. The method of claim 14, further comprising the step of proceeding to the deactivating and determining steps after determining that the second SPS receiver provides better reception of signals from GPS satellites than the first SPS receiver.

16. The method of claim 14, wherein the second SPS receiver is integral to an automobile.

17. A selective call radio (SCR), comprising:
    a wireless transceiver;
    a port;
    a first SPS receiver; and
    a processor coupled to the wireless transceiver, the first SPS receiver and the port, wherein the processor is programmed to:
        detect a second SPS receiver at the port;
        deactivate the first SPS receiver; and
        determine a location of the device according to signals from GPS satellites received by the second SPS receiver.

18. The SCR of claim 17, wherein the processor is further programmed to proceed to the deactivate and determine steps after determining that the second SPS receiver provides better reception of signals from GPS satellites than the first SPS receiver.

19. The SCR of claim 17, wherein the port is coupled to the wireless transceiver for communicating with the second SPS receiver.

20. The SCR of claim 17, wherein data exchanged between the second SPS receiver and the port complies with a protocol developed by the National Marine Electronics Association (NMEA).

* * * * *